United States Patent [19]

Wollner, deceased et al.

[11] Patent Number: 4,892,331

[45] Date of Patent: Jan. 9, 1990

[54] MOTORIZED HEIGHT ADJUSTER FOR ADJUSTING THE HEIGHT OF THE PILLAR LOOP IN VEHICLE SAFETY BELTS

[75] Inventors: Erik Wollner, deceased, late of Alingsas, Sweden, by Barbro Wollner, representative; Barbro Wollner; Leif Ennerdal, both of Alingsas, Sweden

[73] Assignee: Allied Engineering Company S.A., Luxembourg, Luxembourg

[21] Appl. No.: 151,114

[22] Filed: Feb. 1, 1988

Related U.S. Application Data

[63] Continuation of Ser. No. 71,518, Jul. 9, 1987, abandoned.

[30] Foreign Application Priority Data

Jul. 10, 1986 [SE] Sweden .................... 8603077

[51] Int. Cl.[4] ............................................. B60R 22/20
[52] U.S. Cl. ..................... 280/808; 411/400; 411/401; 411/409
[58] Field of Search ........... 280/808, 801, 802; 248/225.2; 411/84, 85, 400, 401, 409, 435, 395, 403; 403/404, 405.1; 297/468, 483

[56] References Cited

U.S. PATENT DOCUMENTS

| 792,594 | 6/1905 | Hiss | 411/400 |
|---|---|---|---|
| 2,346,769 | 4/1944 | Lichtor | 411/400 |
| 2,374,426 | 4/1945 | Diederich | 411/400 |
| 2,625,357 | 1/1953 | Atkinson | 411/400 |
| 2,717,562 | 9/1955 | Ewing | 411/400 |
| 3,456,706 | 7/1969 | Ollis, Jr. | 411/84 |
| 4,522,426 | 6/1985 | Weman | 280/801 |
| 4,547,717 | 10/1985 | Radermacher | 280/808 |
| 4,579,368 | 4/1986 | Kawade et al. | 280/808 |
| 4,627,639 | 12/1986 | Sedlmayr et al. | 280/808 |
| 4,645,233 | 2/1987 | Bruse et al. | 280/808 |

FOREIGN PATENT DOCUMENTS

| 3437491 | 4/1986 | Fed. Rep. of Germany | 411/400 |
|---|---|---|---|
| 292715 | 8/1953 | Switzerland | 411/400 |

Primary Examiner—Charles A. Marmor
Assistant Examiner—Karin Tyson
Attorney, Agent, or Firm—Spencer & Frank

[57] ABSTRACT

A motorized height adjuster for adjusting the height of the pillar loop in vehicle safety belts comprises an elongate bar (10) having a substantially U-shaped cross-section; a threaded spindle (14) rotatably mounted in the bar; a motor (18) for driving the spindle; and a carrier (19) for the pillar loop (20) adapted to be moved in the bar by the rotation of the spindle. The bar is adapted to be attached to the car body at the seat for which the seat belt is intended by means of a first and a second screw means. The screw means are positioned close to the different ends of the bar and have a threaded portion and a main portion. The first screw means (23) has a main portion which is designed to be brought into engagement with the bar (10), when the threaded portion has been screwed into the car body. The main portion is provided with a recess through which a driving shaft (17) between the motor (18) and the spindle (14) can pass freely. Due to the design of the screw means the driving shaft between the motor and the spindle does not prevent the fastening of the bar at the motor end.

10 Claims, 2 Drawing Sheets

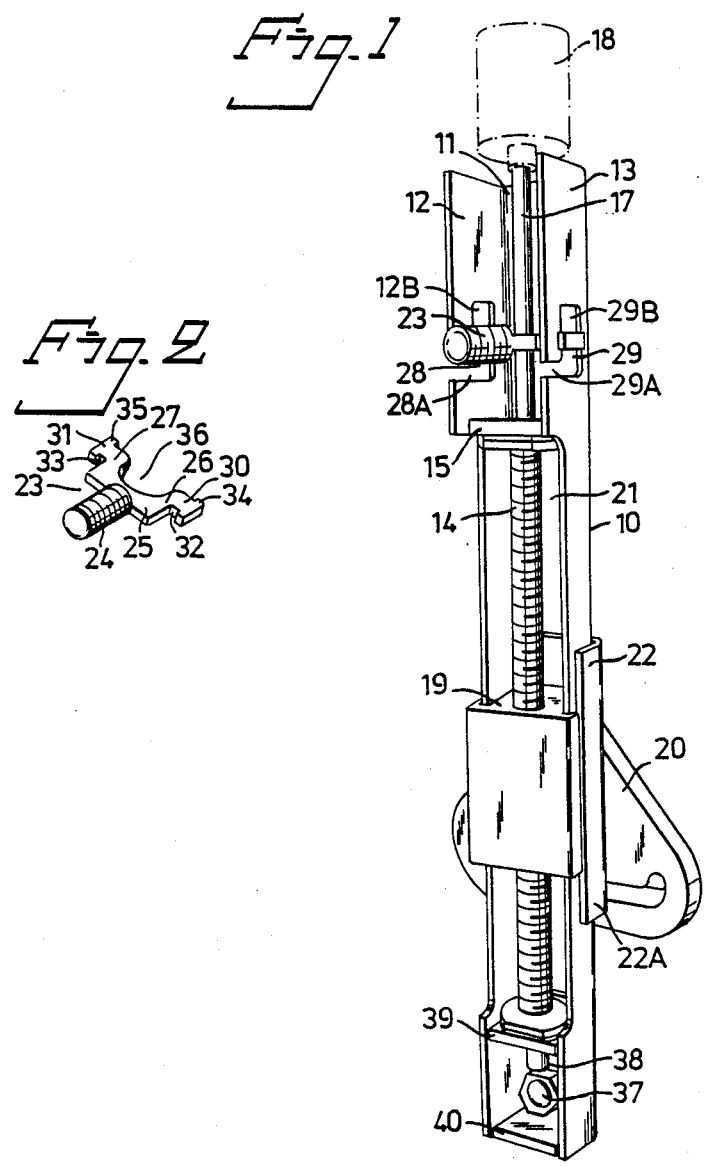

MOTORIZED HEIGHT ADJUSTER FOR ADJUSTING THE HEIGHT OF THE PILLAR LOOP IN VEHICLE SAFETY BELTS

This application is a continuation of co-pending application Ser. No. 071/518 filed July 9th, 1987, now abandoned.

The present invention relates to a motorized height adjuster for adjusting the height of the pillar loop in vehicle safety belts. The height adjuster comprises an elongate bar having a substantially U-shaped cross-section; a threaded spindle rotatably mounted in the bar; a motor for driving the spindle; and a carrier for the pillar loop adapted to be moved in the bar by the rotation of the spindle. The bar is adapted to be attached to the car body at the seat for which the seat belt is intended, by means of a first and a second screw means which are positioned close to the different ends of the bar and which have a threaded portion and a main portion.

Height adjusters for adjusting the height of the pillar loop in vehicle safety belts are previously known. These adjusters are usually of manual type and, thus, require that the person who is going to use the safety belt move the pillar loop by hand to the desired position. As the pillar loop is positioned at the back of the chair, i. e. behind or at the side of the seat of the person, the adjustment of the pillar loop is difficult and uncomfortable.

Therefore, it is frequently desirable that the height adjuster is motorized, so that the adjustment of the pillar loop can be made automatically or by means of an easily accessible control. It is per se not difficult to motorize the height adjuster, but the motor shaft causes difficulties, when the height adjuster is to be attached to the car body. The provision of a motor makes the height adjuster necessarily longer. If the adjuster is to be attached by means of an ordinary screw at the motor end, the screw must be positioned outside the motor, as the driving shaft from the motor prevents the use of an ordinary screw between the motor and the spindle driven by the motor. However, in this case an additional mounting hole for the screw must be provided in the car body, and this should be avoided, if possible. It is therefore highly desirable to design to design the height adjuster in such a way that it can be attached in the holes provided for manual height adjusters. This will avoid the provision of additional mounting holes in the car body, and the purchaser will nevertheless have full freedom to choose a manual or a motorized height adjuster.

The main object of the invention is to provide a motorized height adjuster which at the motor end is adapted to be attached to the car body by a screw means that can be positioned between the motor and the spindle adapted to move the carrier of the pillar loop. A further object of the invention is to provide an improved attachment means at the other end of the height adjuster that provides a strengthening of the bar, so that the bar more reliably can take up the forces appearing at the fastening points. These objects are achieved by giving the height adjuster according to the invention the features set forth in the claims.

BRIEF DESCRIPTION OF THE DRAWINGS

One embodiment of a motorized height adjuster according to the invention will now be further described below with reference to the accompanying drawings.

FIG. 1 is a perspective view of a motorized height adjuster with screw means for attaching the height adjuster to the car body.

FIG. 2 is a perspective view of one of the screw means.

DETAILED DESCRIPTION OF EXEMPLARY EMBODIMENTS

Figure 3:
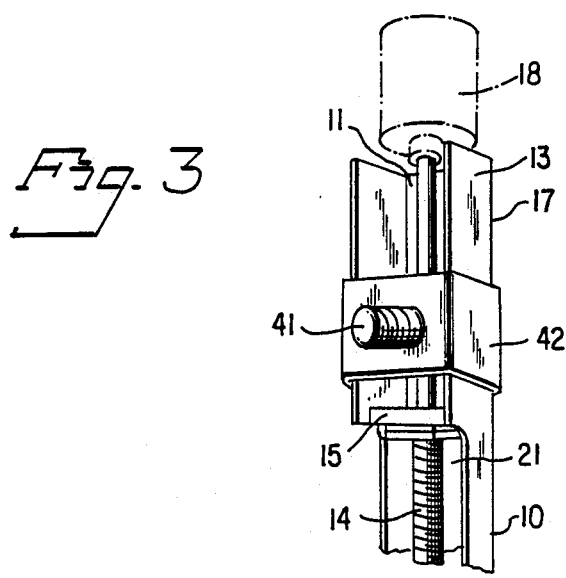
FIG. 3 is a perspective view of an alternative embodiment of the present invention.

The height adjuster shown in FIG. 1 comprises a bar 10 having a substantially U-shaped cross-section. The bar has a bottom portion 11 and two side portions 12,13. A spindle 14 is rotatably mounted in the bar in cross-walls 15 and 39. The spindle 14 is provided with external threads and, at the upper end shown in the Figure, the shaft of the spindle is provided with an extended portion 17 connected to a motor 18. A carrier 19 is movably mounted in the bar 10 and provided with a through hole through which the spindle 14 runs. The through hole of the carrier is provided with internal threads adapted to engage with the external threads of the spindle, so that the carrier is moved in the bar when the spindle is rotated. A pillar loop 20 for the strap of the safety belt is attached to the carrier by means of a screw running through a slot 21 in the bottom portion 11 of the bar. A strengthening plate 22 is provided between the pillar loop 20 and the bottom portion of the bar. The plate 22 has a substantially U-shaped cross-section, so that the side portions 22A of the plate can catch the bar, and a length substantially longer than the length of the carrier 19, thus stabilizing the bar when the pillar loop is loaded.

The height adjuster is provided with a first screw means 23 positioned between the motor 18 and the threaded portion of the spindle 14 for attaching the motor end of the bar to a supporting portion of the car body. The screw means 23 is provided with a threaded portion 24 and a main portion 25, as clearly shown in FIG. 2. The main portion is designed as a hook having two arms 26,27, and each one of the side walls 12,13 of the bar is provided with a L-shaped slot 28 and 29, respectively. The L-shaped slots start at the free edges of the side walls, and their outer portions 28A,29A run substantially perpendicularly to the free edges of the side walls and then turn at substantially right angles, so that the inner portions 28B,29B of the slots run in the longitudinal direction of the bar towards the motor. The slots are so designed that the main portion 25 of the screw means can be brought into the bar 10, the outer portions of the arms 26,27 sliding in the outer portions 28A,29A of the slots, and then moved in the bar in the longitudinal direction of the bar, the inner portions of the arms 26,27 sliding in the inner portions 28B,29B of the slots.

The arms 26,27 of the main portion 25 of the screw means are each at their free ends provided with a flange 30 and 31, respectively. These flanges project substantially perpendicularly from the arms 26,27 in opposite directions away from each other and are adapted to engage with the side walls 12,13 of the bar 10. The flanges 30,31 are provided in the same plane. Each flange 30.31 is provided with a notch 32,33 in the edge facing the threaded portion of the screw means. With regard to position and width, these notches correspond to the side walls of the bar 10, so that the slot edges of the side walls project into the notches of the flanges.

Furthermore, each flange 30,31 is provided with a projecting portion 34,35 at the edge turned away from the threaded portion of the screw means, so that the flanges have a width larger than the width of the inner portions 28B,29B of the L-shaped slots. When the main portion 25 is inserted into the bar 10 and the flanges 30,31 of the arms are in the inner portions 28B,29B of the L-shaped slots, the flanges thus engage with both the opposite slot edges of the side walls of the bar, thus providing a maximally safe hold of the bar.

The main portion 25 of the screw means 23 is further provided with a recess 36 which is so large that the spindle shaft 17 freely can pass the screw means in the bar.

The opposite end of the bar 10 with regard to the motor may be fastened by means of an ordinary screw. However, this screw is not shown on the drawing. The bottom portion 11 of the bar is at this end provided with a hole 37 for the passage of the screw which then can be screwed into a fastening hole in the car body. A U-shaped clamp 38 is positioned in the bar, the side walls 39,40 of the clamp running perpendicularly to the side walls 12,13 of the bar and perpendicularly to the bottom portion 11 of the bar. The bottom portion of the clamp is provided with a hole corresponding to the hole in the bottom portion of the bar, so that the fastening screw can pass through both the bottom portion of the bar and the bottom portion of the clamp. The side walls 39,40 of the clamp have a height that is substantially as high as the internal height of the side walls of the bar, so that the side wall edges of the clamp lie in the same plane as the side wall edges of the bar. When the fastening screw is tightened, the clamp will become fixed in the bar and strengthen the bar. The internal side wall 39 of the clamp can at the same time be used as a bearing for one end of the spindle. The bearing plate 15 for the other end of the spindle can then be welded to the bar 10. This will provide a strengthening also of the motor end of the bar which is desirable with regard to the slots provided in the side walls of the bar. If a bearing plate for the spindle is welded at the motor end, a bearing plate that can be assembled has to be provided at the opposite end of the bar, in order to make it possible to assemble the spindle. The provided clamp 38 gives an excellent solution of this problem at the same time as the bar is strengthened at the end opposite to the motor end.

When attaching the motorized height adjuster the first screw means is first fastened in a mounting hole in the car body. The bar is then hitched to the main portion of the fastened screw means. The other screw means, which preferably is an ordinary screw or a bolt, is then fastened. Thus, the bar is attached to the car body with the bottom portion facing the inside of the vehicle.

Figure 4:
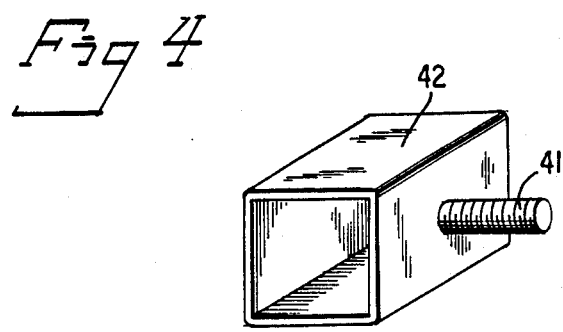
FIG. 4 is a detailed view of the bolt of FIG. 3.

Whilst only one embodiment of the height adjuster according to the invention has been described above and illustrated on the drawing, it is evident that many modifications and variations are possible within the scope of the invention. The main portion of the first screw means can for example be provided with arms engaging with the bottom portion of the bar instead of with the side walls of the bar. In such a case, the arms can run on either side of the driving shaft of the spindle, and the arms can then engage in one and the same slot in the bar. The flanges on the ends of the arms can then be turned upwards or downwards. The arms can also be designed in many different ways and may also run outside the bar, the projecting flanges of the arms then being directed towards each other. However, such a design requires a larger space. The main portion of the screw means can also be a sleeve grasping around the bar. As illustrated in FIGS. 3 and 4 as sleeve and threaded portion 41. This embodiment has the advantage that no slots are necessary in the bar but the disadvantages that the sleeve requires a larger space and that it is more difficult to provide such a main portion with a threaded portion to be screwed into the car body. The bar can also be attached with the motor downwards, when desired, and the L-shaped slots can have their inner portions running towards the motor or away from the motor. The L-shaped slots must not necessarily be open at the edges of the side walls.

What is claimed is:

1. Motorized height adjuster for adjusting the height of the pillar loop in vehicle safety belts, comprising;
   an elongate bar having a substantially U-shaped cross-section;
   a threaded spindle rotatably mounted in the bar;
   a motor positioned adjacent a first end of said bar and connected to a first end of said spindle for driving the spindle;
   a carrier for the pillar loop adapted to be moved along the bar by the rotation of the spindle, and
   first screw means for attaching said first end of said bar to said vehicle body and second screw for attaching a second end of said bar to the vehicle body, wherein
   the first screw means has a main portion configured for engagement with the bar between said motor and a second end of said spindle, and configured for positioning between the sidewalls of said bar, said main portion provided with a recess for unobstructed accommodation of said spindle.

2. Height adjuster according to claim 1, wherein the main portion of the first screw means includes a hook and the bar includes at least one slot for engagement with the hook.

3. Motorized height adjuster for adjusting the height of the pillar loop in vehicle safety belts, comprising;
   an elongate bar having a substantially U-shaped cross-section;
   a threaded spindle rotatably mounted in the bar;
   a motor positioned adjacent a first end of said bar and connected to a first end of said spindle for driving the spindle;
   a carrier for the pillar loop adapted to be moved along the bar by the rotation of the spindle, and
   first screw means for attaching said first end of said bar to said vehicle body and second screw means for attaching a second end of said bar to the vehicle body, wherein
   the first screw means has a main portion configured for engagement with the bar between said motor and a second end of said spindle, said main portion provided with a recess for unobstructed accommodation of said spindle, wherein
   the main portion of the first screw means includes a hook and
   said bar includes at least two slots for engagement with said hook, and
   each side wall of the bar is provided with one of said slots.

4. Height adjuster according to claim 3, wherein the slots in the side walls are substantially L-shaped and run from the edges of the side walls, the inner portions of the slots running in the longitudinal direction of the bar.

5. Height adjuster according to claim 3, wherein the hook has two arms projecting from the threaded portion, and in that the arms at their free ends each are provided with a flange, the flanges being configured for engagement with the bar.

6. Height adjuster according to claim 5, wherein the flanges project substantially perpendicularly from the arms in opposite directions from each other and are positioned in the same plane.

7. Height adjuster according to claim 6, wherein each flange includes a notch in the edge facing the threaded portion, the notches configured for accommodation of the side walls of the slot edges of the U-shaped bar.

8. Height adjuster according to claim 7, wherein each flange has an outer end provided with a projecting portion at the edge turned away from the threaded portion, so that the flanges have a width which is larger than the width of the slots of the side walls.

9. Motorized height adjuster for adjusting the height of the pillar loop in vehicle safety belts, comprising;
 an elongate bar having a substantially U-shaped cross-section;
 a threaded spindle rotatably mounted in the bar;
 a motor positioned adjacent a first end of said bar and connected to a first end of said spindle for driving the spindle;
 a carrier for the pillar loop adapted to be moved along the bar by the rotation of the spindle,
 first screw means for attaching said first end of said bar to said vehicle body, and
 second screw means for attaching a second end of said bar to the vehicle body, configured for insertion through a hole in the bar and to be screwed into the vehicle body, and
 a U shaped clamp means for positioning between said second screw means and said bar with the side walls of said clamp perpendicular to the sidewalls and the back wall of said bar, and one side wall of said clamp acting as a bearing for a second end of said spindle, wherein
 the first screw means has a main portion configured for engagement with the bar between said motor and a second end of said spindle, said main portion provided with a recess for unobstructed accommodation of said spindle.

10. Method for mounting a height adjuster according to claim 1, comprising the steps of:
 securing said first screw means to said vehicle body,
 engaging said bar with said main portion of said first screw means, and
 securing said second end of said bar to said vehicle body with said second screw means.

* * * * *